Dec. 10, 1968
SHINKICHI YANO
3,415,547
ANNULAR LOCKING ASSEMBLY USED IN RING ATTACHMENTS FOR
PREVENTING WATER LEAKAGE IN WATER PIPE CONNECTIONS
Filed Aug. 26, 1966
3 Sheets-Sheet 1
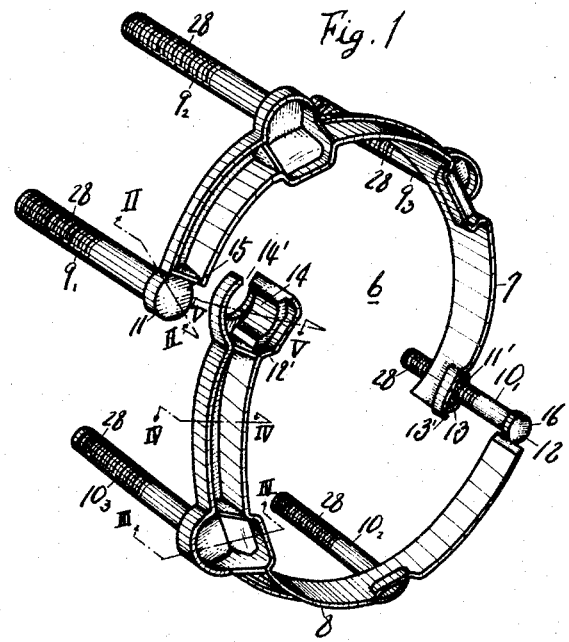
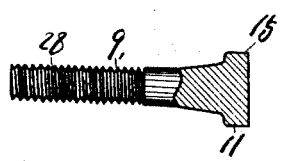
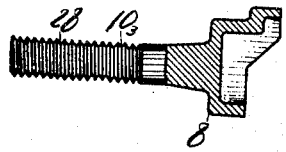
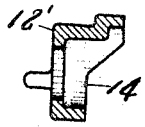
SHINKICHI YANO,
INVENTOR
BY *Hall & Houghton*
Attorney.

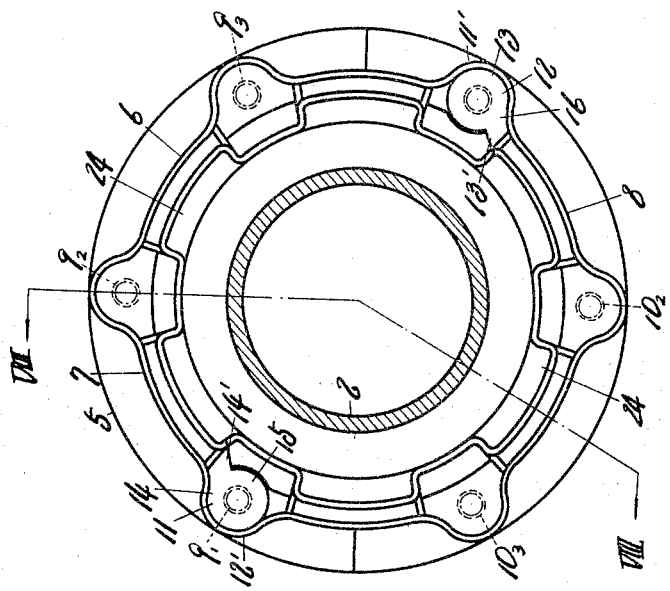
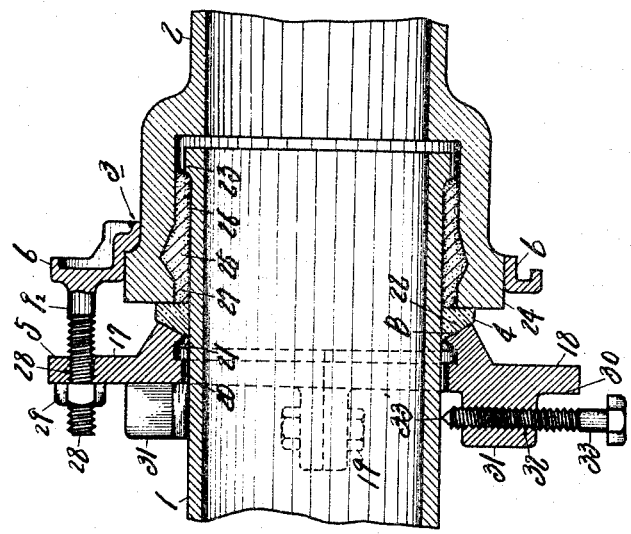

Dec. 10, 1968 SHINKICHI YANO 3,415,547
ANNULAR LOCKING ASSEMBLY USED IN RING ATTACHMENTS FOR
PREVENTING WATER LEAKAGE IN WATER PIPE CONNECTIONS
Filed Aug. 26, 1966 3 Sheets-Sheet 3

SHINKICHI YANO,
INVENTOR

BY Hall & Hughton
Attorney ns PatentOffice 3,415,547
Patented Dec. 10, 1968

3,415,547
ANNULAR LOCKING ASSEMBLY USED IN RING ATTACHMENTS FOR PREVENTING WATER LEAKAGE IN WATER PIPE CONNECTIONS
Shinkichi Yano, 137–1 7-chome, Sakurazuka-Hondori, Toyonaka-shi, Osaka-fu, Japan
Filed Aug. 26, 1966, Ser. No. 575,283
Claims priority, application Japan, June 17, 1966, 41/39,488
5 Claims. (Cl. 285—337)

ABSTRACT OF THE DISCLOSURE

Means for clamping a gasket against the bell and spigot joint of a pipe line is characterized in that one of the clamping rings is formed of two unitary sections, each arcuate, each provided at one end with a unitary first stud parallel to the pipe axis, and each having an apertured retaining means at its other end through which the first stud of the other section can be passed on flexing of the planes of the sections to cross each other. The two unitary sections have further studs thereon and preferably are duplicates of each other. The second ring has apertures to receive all the studs of the assembled first ring. The second ring, preferably, is made up of two arcuate parts, duplicates of each other, secured together in complementary abutting relation to complete the ring; is provided with a gasket compressing shoulder on one face; and is provided with radially acting means on its other face to clamp it to the pipe after the gasket has been compressed.

Figure 7:
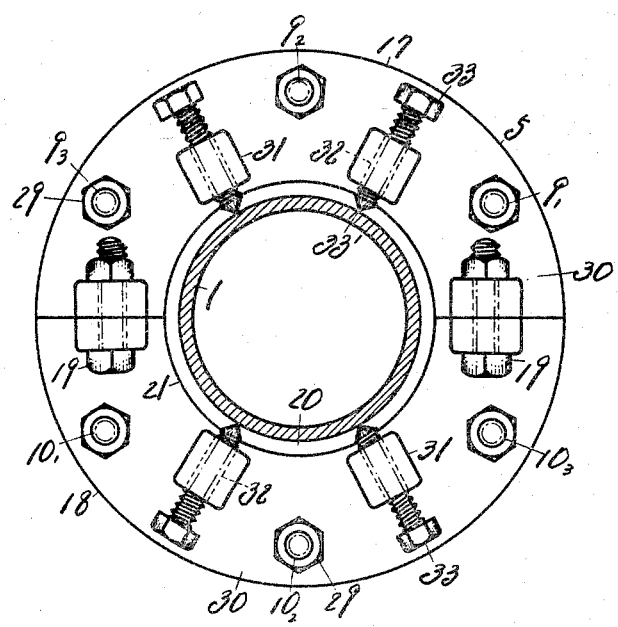

Background of the invention (1) *Field of the invention.*—This invention relates to an annular locking assembly used in ring attachments for preventing water leakage in water pipe connections of the bell and spigot type, and more particularly to a device comprising a pair of ring clamps for clamping a gasket against a bell and spigot joint therein.

(2) *Prior state of the art.*—The conventional known annular locking assembly used in bell and spigot type water pipe couplings has flanges provided on the opposed ends of each bell abutting ring half and adapted to be brought into surface contact with the flanges of the other ring half when the ring halves are coupled together by means of bolts and nuts. Thereafter, separate bolts are axially inserted into holes which are bored beforehand in the annular locking assembly in circumferentially equidistantly spaced positions, the front ends of the bolts being inserted into the holes of the corresponding packing clamping ring, and nuts are then screwed on the bolts from the side of the other lateral surface of the clamping ring, whereby the clamping ring and the annular locking assembly are axially coupled together. The aforesaid known annular locking assembly requires two kinds of bolts and nuts so that the inventory management becomes more troublesome and the operation on the working site requires much trouble. Further, since the separate manufacture of annular locking assemblies and two kinds of bolts and nuts is required, the cost involved becomes high. Moreover, if the bolts and nuts become loosened after assembly, particularly if those bolts and nuts which are associated with the flanges become loosened, the coupling device is caused to chatter, so that water leakage at said flanges will inevitably occur.

Summary of the invention

In the light of the above-mentioned drawbacks of the known annular locking assemblies, the present invention provides improvements therein, a first feature thereof residing in the integral casting of an annular locking assembly and its fastener screw rods, thereby excluding the necessity of separately manufacturing such fastener screw rods. A second feature resides in the employment of the system of fittings for coupling the ring halves by utilizing certain of the fastener screw rods, thereby making it unnecessary to use the conventionally required bolts and nuts, thus saving the labor of manufacture and assembly. A further feature resides in making unnecessary the coupling bolts and nuts and the heads of the fastener bolts, thereby reducing the total weight of the annular locking assembly, saving material by as much amount as corresponds thereto, and lowering the price. Another feature is that the fastener screw rods are secured to the annular locking assembly integrally therewith in the form of studs and the coupling system of the ring halves takes the form of the system of fittings, thereby facilitating the assembling operation on the working site. Yet another feature is that the number of the accessories is reduced to facilitate the inventory management, particularly that inventory management as associated with water service emergency materials. A further feature of the present invention resides in the coupling structure of the annular locking assembly. That is, the first fastener screw rods or studs at the ends of the respective ring sections are adapted to be inserted through the corresponding fitting cutouts of the apertured retaining means at the other ends of the other sections by slightly twisting or flexing the respective ring halves, and after they are untwisted or unflexed the base portions of the said fastener screw rods are tightly fitted in the fitting portions thereby coupling the ring halves together. By virtue of this structure, the annular locking assembly cannot easily tend to be accidentally separated apart even if the slacking of the bolts and nuts occurs to some extent, so that there can be obtained an annular locking assembly having stability in coupled condition.

The manner of embodying the present invention will now be described in more detail with reference to the drawings.

Short description of the drawings

In the accompanying drawings, FIG. 1 is a perspective view of the first ring of an annular locking assembly according to the invention illustrating the disassembled condition thereof; FIGS. 2 through 5 are sectional views taken along lines II—II, III—III, IV—IV and V—V of FIG. 1, respectively; FIG. 6 is a front view of a water pipe connection formed by a water leakage preventing ring attachment incorporating the first and second rings of the present annular locking assembly; FIG. 7 is a rear end view of said ring attachment more particularly showing the second ring; and, FIG. 8 is a longitudinal sectional view taken along line VIII—VIII of FIG. 6.

Description of preferred embodiment

The present invention provides an annular locking assembly or first ring clamp 6 as shown in the drawings wherein a bell and spigot connection 3 between water pipes 1 and 2 is fitted with a rubber ring or gasket 4 at the opposed sides of which are located a second clamping ring and the annular locking assembly or first ring 6, which are longitudinally tightened and connected together in place by screw means, the invention being characterized in that ring halves 7 and 8 forming the annular locking assembly 6 are provided with first and further fastener screw rods $9_1$, $9_2$, $9_3$ and $10_1$, $10_2$, $10_3$, respectively, formed integrally therewith and projecting in a longitudinal direction, the first of said fastener screw rods of each ring half, $9_1$ and $10_1$, merging into connecting ends 11 and 12 which are diametrically opposed ones of the connecting ends 11, 11' and 12, 12' of the respective ring halves 7 and 8, the other diametrically opposed connecting ends 11' and 12' being formed with the stud retaining or fitting portions 13 and 14 having cutouts or apertures 13' and 14' adapted to receive the corresponding fastene screw rods $9_1$ and $10_1$ of the ring halves 7 and 8, respectively, so that the base portions 15 and 16 of the fastener screw rods $9_1$ and $10_1$ are tightly fitted in said fitting portions 13 and 14.

Like the annular locking assembly, the clamping ring 5 is composed of two ring halves 17 and 18 which are coupled together in complementary abutting relation by means of fastener screw rods 19. The clamping ring 5 has an annular projection 21 provided on the inner surface 20 thereof presenting a shoulder concentric with the pipe axis for pressing the rubber ring 4. The end edge of the annular projection 21 is inclined as at 22 in such a manner as to conform to the outer inclined surface B of the rubber ring 4. The front outer peripheral edge of the spigot end of water pipe 1 is formed with a projection 23 in order to prevent the water pipe from slipping off. Also, the front outer peripheral edge of the other water pipe 2 is formed with a projection band 24 (the bell) adapted to be engaged with the annular locking assembly 6, thereby allowing the coupling of the clamping ring 5 and annular locking assembly 6. A filler consisting of waste thread 26 and lead 27 is packed into a clearance 25 in the fitting region (between the bell and spigot) of the water pipes 1 and 2. The annular locking assembly 6 consists of two ring halves 7 and 8 having fastener screw rods $9_1$, $9_2$, $9_3$ and $10_1$, $10_2$, $10_3$, respectively, integrally formed around the peripheries of the ring halves by casting process. The end regions of these fastener screw rods are formed with threads 28. The location of the fastener screw rods $9_1$, $9_2$, $9_3$ and $10_1$, $10_2$, $10_3$ relative to the ring halves 7 and 8 is such that when the ring halves are coupled together to form a complete ring, these fastener screw rods assume circumferentially equidistantly spaced positions. Of the opposed end connecting portions 11, 11' and 12, 12' of the ring halves 7 and 8, the connecting portions 11 and 12 are provided with fastener screw rods $9_1$ and $10_1$. At the time of coupling the ring halves, these fastener screw rods $9_1$ and $10_1$ serve as fastener screw rods for the mating ring half connecting portions 12' and 11'. Further, the other connecting portions 11' and 12' are provided with fitting portions 13 and 14, respectively, adapted to receive in tight fit relation the base portions of the fastener screw rods.

The fitting portions 13 and 14 are formed with cutouts 13' and 14', respectively, in order to allow the insertion of the fastener screw rods of the corresponding ring halves. That is, the coupling of the ring halves 7 and 8 is effected in such a manner that while the ring halves are slightly twisted the screw rods $9_1$ and $10_1$ are inserted into the fitting portions 14 and 13 through the cutouts 14' and 13', respectively and thereafter by untwisting the ring halves into their original condition the screw rod base portions 15 and 16 are tightly fitted in the fitting portions 14 and 13, thus constituting the annular locking assembly 6. Thus, the coupling of the two ring halves 7 and 8 is effected with twisting followed by untwisting operation. In interconnecting the water pipes 1 and 2 by using the aforesaid clamping ring 5 and annular locking assembly 6, the rubber ring 4 is first fitted on the water pipe 1, and the water pipes 1 and 2 are then brought into abutment against each other with the filler placed in the clearance 25, whereafter the clamping ring 5 and annular locking assembly 6 are fitted on the water pipes in the above-mentioned manner. Thereafter, the fastener screw $9_1$, $9_2$, $9_3$ and $10_1$, $10_2$, $10_3$ of the annular locking assembly 6 are inserted into the holes 23 bored in the clamping ring 5 around the peripheral surface thereof, and the nuts 29 are screwed on the fastener screw rods $9_1$, $9_2$, $9_3$ and $10_1$, $10_2$, $10_3$ from the other side surface of the clamping ring 5, thereby axially connecting the rings 5 and 6. At this time, the rubber ring 4 is pressed by the inclined surface 22 of the annular projection 21 of the clamping ring 5 in both a horizontal and a vertical direction, so that the jointed portions of the pipes 1 and 2 are maintained in sealed condition. Further, the other side surface of the clamping ring 5 is provided with means for further increasing the firmness of the aforesaid connection. Thus, with the aforesaid connecting device, the nuts which couple the rings 5 and 6 together might tend to become slack due to vibrations or shocks during use to cause the relaxation of the tension afforded by the rubber ring 4, resulting in water leakage through the connecting portions. In order to exclude such possibility, the outer surface 30 of the clamping ring 5 is provided with a plurality of brackets 31 in circumferentially equidistantly spaced positions, each bracket being formed with a threaded hole 32 bored therethrough in such a manner as to be perpendicular to the axis of the water pipe 1. A threaded bolt 33 having its front end pointed as at 33' is screwed into each threaded hole 32 until the front end is radially pressed against the peripheral surface of the water pipe 1, whereby the clamping ring 5 is directly fixed to the water pipe 1 to secure the increased stability of the pressing force against the rubber ring 4.

What is claimed is:

1. A device comprising a pair of ring clamps for clamping a gasket against the bell and spigot joint of a pipe line, particularly characterized in that
    (a) the first of said ring clamps comprises a pair of unitary arcuate sections cooperable to form a ring concentric with the pipe axis, each of said sections having
        (1) first stud means at one of its ends projecting parallel to the pipe axis,
        (2) retaining means at the other of its ends positioned to lie diametrically opposite said first stud means, said retaining means being apertured to permit passage therethrough of the first stud means of the other of said sections, and
        (3) further stud means positioned between said first stud means and said retaining means and extending parallel to said first stud means,
    and said sections being capable of being flexed to enable the first stud means of each section to be passed into the retaining means of the other section for assembling said first ring clamp;
    (b) the second of said ring clamps comprises aperture means aligned for the passage of the first stud means and further stud means of the assembled first ring clamp therethrough for assembling the pair of ring clamps; and
    (c) securing means engageable with said studs for maintaining said assemblies and drawing said first and second ring clamps toward each other.

2. A device according to claim 1 in which
    (d) the two unitary sections of the first of said ring clamps are identical half ring sections each having three stud means parallel to the pipe axis.

3. A device according to claim 1 in which
    (d) the second of said ring clamps comprises a pair of arcuate sections and securing means for assembling them together in complementary abutting relation to form the second ring clamp, said second ring clamp, when assembled, presenting a gasket clamping shoulder concentric with the pipe axis.

4. A device according to claim 3 in which
    (e) the two sections of the second of said ring clamps are identical half ring sections.

5. A device according to claim 1, in which
    (d) the second of said ring clamps comprises
        (1) a gasket clamping shoulder at one face thereof concentric with the pipe axis, and
        (2) radially acting pipe clamping means at the other face thereof for clamping said second ring clamp to the pipe after the clamping of the gasket by the device.

References Cited

UNITED STATES PATENTS

| | | | |
|---|---|---|---|
| 623,208 | 4/1899 | Foltz | 285—114 |
| 893,170 | 7/1908 | Huser | 285—114 |
| 1,364,313 | 1/1921 | Rice | 285—413 |
| 1,588,301 | 6/1926 | Bray | 285—114 |
| 2,305,377 | 12/1942 | Corey | 285—2 |
| 2,679,410 | 5/1954 | Boughton | 285—337 |
| 2,822,195 | 2/1958 | Hoke | 285—337 |
| 3,249,370 | 5/1966 | Brogden | 285—114 |

FOREIGN PATENTS 120,462 Germany.

CARL W. TOMLIN, *Primary Examiner.*

WAYNE L. SHEDD, *Assistant Examiner.*

U.S. Cl. X.R.

285—368, 400, 415